United States Patent [19]

Wanner et al.

[11] 4,131,165

[45] Dec. 26, 1978

[54] HAMMER DRILL

[75] Inventors: Karl Wanner, Echterdingen; Manfred Bleicher, Leinfelden; Jörg Falchle, Bempflingen, all of Fed. Rep. of Germany

[73] Assignee: Robert Bosch GmbH, Stuttgart, Fed. Rep. of Germany

[21] Appl. No.: 777,056

[22] Filed: Mar. 14, 1977

[30] Foreign Application Priority Data

Apr. 28, 1976 [DE] Fed. Rep. of Germany ....... 2618596

[51] Int. Cl.² .......................... E02D 7/02; B23B 5/34
[52] U.S. Cl. ...................... 173/48; 173/133; 279/19.3; 279/75; 173/139
[58] Field of Search ................. 173/48, 93, 93.5, 93.6, 173/93.7, 132, 133, 139; 279/19, 19.1–19.7, 74, 75

[56] References Cited

U.S. PATENT DOCUMENTS

| | | | |
|---|---|---|---|
| 1,208,141 | 12/1916 | Greve | 279/19.2 X |
| 1,657,317 | 1/1928 | Potter | 279/19.3 X |
| 1,880,337 | 10/1932 | App | 173/133 X |
| 2,608,413 | 8/1952 | Peck | 279/19 |
| 2,767,957 | 10/1956 | Feucht | 173/133 |
| 3,828,863 | 8/1974 | Bleicher et al. | 173/48 |
| 3,874,460 | 4/1975 | Schmid et al. | 173/48 X |

FOREIGN PATENT DOCUMENTS 399598  2/1974  U.S.S.R. .................... 173/139

*Primary Examiner*—Lawrence J. Staab
*Attorney, Agent, or Firm*—Michael J. Striker

[57] ABSTRACT

A hammer drill has a movable tool and a driving element substantially coaxial with the tool. The driving element directly transmits axial impact from the same to the tool without transmission of torque. A tool holder surrounds proximal end portions of the driving element and the tool and transmits torque from the former to the latter without transmission of axial impact. Drive means are provided for selectively imparting torque and/or axial impact to the driving element. The tool holder comprises a sleeve which surrounds the proximal end portions. The sleeve is axially movable relative to the driving element and the tool and, at the same time, are connected with them for joint rotation therewith. An additional sleeve is provided surrounding the sleeve and enabling an operator to hold and to guide the hammer drill.

19 Claims, 4 Drawing Figures

HAMMER DRILL

BACKGROUND OF THE INVENTION

The present invention relates to a hammer drill. More particularly, it relates to such a hammer drill which has a tool, a tool holder and drive means for selectively imparting torque and/or axial impact to the tool.

Hammer drills of this type have already been proposed in the art. Such hammer drills comprise a tool which has a shaft provided with two grooves of a semicircular cross-section extending lengthwise an axis of the shaft and closed at both their axial ends. The closed end portions of the grooves is of a spherical form. Radially movable ball-shaped locking elements engage the above-mentioned grooves. Torque imparted by the drive means to the tool holder is transmitted to the tool shaft by means of these locking elements. An intermediate impact element transmits impacts to a trailing end portion of the tool shaft. However, the spherical end portions of the grooves serve at the same time as axial stop means for limiting axial movement of a drill spindle in a recess of the tool during transmission of axial impact, and thereby also take part in transmission of the latter. In this construction the ball-shaped locking elements serve for simultaneously transmitting torque and axial locking, and therefore are subject to very high wear. This also does not create conditions for direct low-loss and recoil-less transmission of impact energy. In addition, this results in that a tool holder is heated during operation to a substantial degree, and also in that relatively high pressing force is required.

SUMMARY OF THE INVENTION

Accordingly, it is an object of the present invention to provide an improved hammer drill which avoids the afore-mentioned disadvantages of the prior art hammer drills.

More particularly, it is an object of the present invention to provide a hammer drill with a tool holder having separate means for independently of one another transmitting torque and axial impact.

Another object of the present invention is to provide a hammer drill with a tool holder whose parts are less subject to wear and heating than those of the conventional hammer drills.

Still another object of the present invention is to provide a hammer drill which creates better conditions for direct low-loss and recoil-less transmission of impact energy than the conventional hammer drills.

In keeping with these objects, and with others which will become apparent hereafter, one feature of the present invention is that the hammer drill comprises a movable tool having a first end portion and a driving element coaxial with the tool having a second end portion directly transmitting axial impact from the driving element to the tool without transmission of torque; a tool holder outwardly surrounding the second and the first end portions of the driving element and the tool respectively, and transmitting torque from the former to the latter without transmission of axial impact; and drive means for driving the driving element.

The drive means are means for selectively imparting torque and/or axial impact to the driving element. The tool holder comprises a sleeve-shaped element coaxially surrounding the above-mentioned end portions, which sleeve-shaped element is axially movable relative to and connected for joint rotation with the driving element and the tool.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
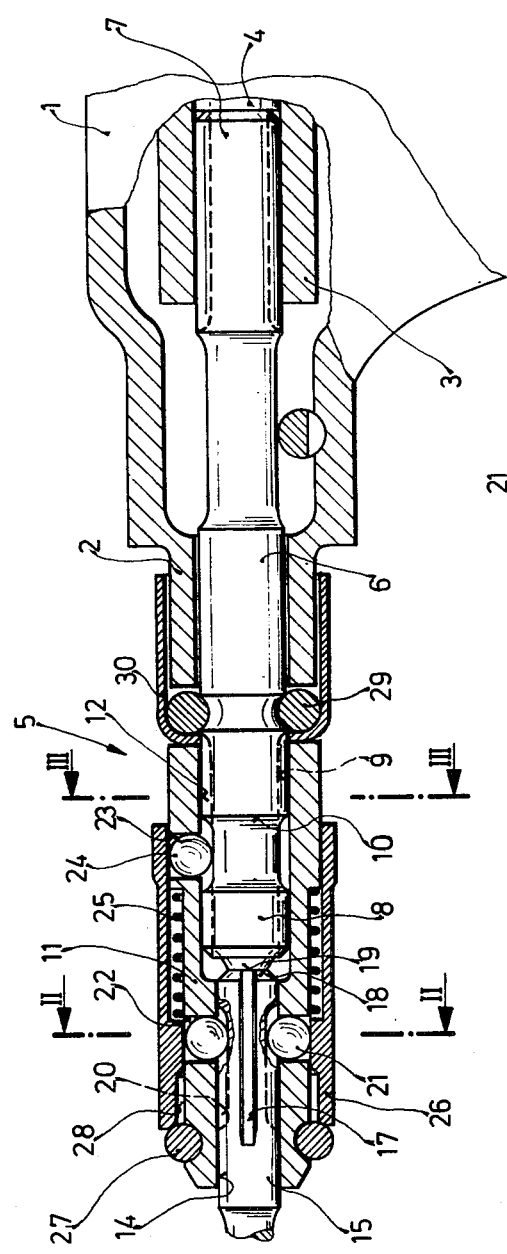
FIG. 1 is a longitudinal sectional view of a hammer drill of the present invention.
Figure 2:
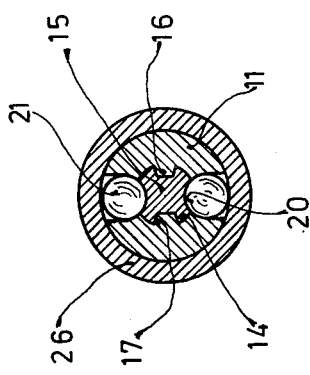
FIG. 2 is a cross section taken through the line II—II of FIG. 1.
Figure 3:
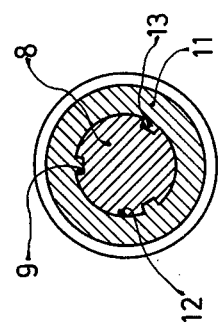
FIG. 3 is a cross section taken through the line III—III of FIG. 1.

As clearly shown in FIG. 1, a hammer drill 1 has a housing provided with a tubular part 2, and a sleeve-shaped tool head 3 located within the tubular part 2. The tool or a 3 is provided with per se known means for transmission of torque, such as, for instance, splined connecting elements or hexagonal inner surface. An intermediate impact element 4 connected with a per se known and not shown impact mechanism of the hammer drill, is received in the tool head 3 and transmits axial impact from the impact mechanism. When the hammer drills are used for essentially hard operations, a shank of a tool may be directly connected to the tool head for directly transmitting axial impacts. In FIGS. 1 and 2 a tool holder 5 is shown which has a longitudinal axis and is connected to the tool head 3. The tool holder 5 serves for coupling the tool with the hammer drill 1 so that the latter selectively impart torque and/or axial impact to the tool. The tool holder 5 is particularly suitable for receiving therein drills having substantially small diameters. The tool holder 5 must positively lock the drill so as to prevent dropping out of the latter as a result of awkward actions of an operator or of accidents. At the same time, the tool holder 5 must be easily demountable.

A spindle 6 is provided having a longitudinal axis and a shank 7 on a trailing end thereof, which shank 7 is received in the tool head 3 and axially abuts on the intermediate impact element 4. A leading end portion 8 of the spindle 6 is provided with three circumferentially spaced axially extending grooves 9 having radially extending side wall portions. A recess is formed as a ring-shaped groove 10 on the outer surface of the leading end portion 8 of the spindle 6 so that the grooves 9 extend substantially normal to and intersect the groove 10. The leading end portion 8 of the spindle 6 forms a driving element for the tool holder 5.

A sleeve 11 having a longitudinal axis surrounds the leading portion 8 of the spindle 6 and is axially movable relative to the same. The sleeve 11 has a first axial bore 12 whose inner wall is provided with three circumferentially spaced strip-shaped projections 13 each engaging the respective one of the grooves 9. The strip-shaped projections 13 similarly to the grooves 9, have substantially radially extending side wall portions. The interengaging projections 13 and grooves 9 transmit torque from the leading portion 8 of the spindle 6 by force acting upon the side wall portions of the above mentioned interengaging projections and grooves substantially normal relative to the same. However, this does not limit axial movement of the tool holder 5 relative to the spindle 6.

The sleeve 11 has a second axial bore 14 coaxial with the first axial bore 12 and open at the leading end opposite to the first axial bore. The second axial bore 14 is of a smaller diameter than that of the first axial bore 12 for reasons of wear resistance. The inner wall of the second axial bore 14 is provided with two circumferentially spaced strip-shaped projections 16 which are located diametrically opposite relative to one another and have substantially radially extending preferably flat side wall portions. The projections 16 engage grooves 17 formed on the trailing end portion of a tool shaft 15 and open at the trailing end of the latter. The interengaging projections 16 and grooves 17 transmit torque from the sleeve 11 of the tool holder 5 by force acting upon and substantially normal relative to the side wall portions of the above-mentioned interengaging projections and grooves.

The trailing end portion of the tool shaft 15 has an end face surface 18 abutting on an end face surface 19 of the leading end portion 8 of the spindle 6. The thus arranged end face surfaces 18 and 19 directly transmit axial impact from the spindle 6 to the shaft 15 of the tool. Two diametrically opposite recesses are provided formed as grooves 20 on the outer surface of the tool shaft 15 and located at a diameter perpendicular to the diameter at which the grooves 17 are located. Radially movable locking elements formed as balls 21 are received in first radial bores 22 of the sleeve 11 and each engages the respective one of the grooves 20. Each of the grooves 20 has two closed axially spaced end portions. The trailing end portion of the sleeve 11 has three second radial bores 23. Radially movable locking elements formed as balls 24 are received in the respective second radial bores 23. Inner outlet end portions of the radial bores 22 and 23 are slightly reduced so as to prevent dropping out of the balls 21 and 24 therefrom.

A sliding sleeve 26 having a longitudinal axis surrounds the sleeve 11 and is axially movable relative to the latter against force of a spring 25. The sliding sleeve 26 overlaps outer inlet end portions of the radial bores 22 and 23 and thereby limits radially outward movement of the balls 21 and 24 so that the parts received in the radial bores 12 and 14 of the sleeve 11, that is the leading end portion 8 of the spindle 6 and the tool shaft 15, cannot be removed from the sleeve 11. Since, on the one hand, a width of the ring-shaped groove 10 in the leading end portion 8 of the spindle 6 is essentially greater than the diameter of the ball 24, and, on the other hand, an axial length of the grooves 20 in the tool shaft 15 is essentially greater than the diameter of the balls 21, the sleeve can axially move relative to the parts 8 and 15 received in the axial bores 12 and 14 of the sleeve 11.

The spring 25 axially presses the sliding sleeve 26 in its working position against an O-ring 27 which is received in a ring-shaped groove provided in the leading end portion of the sleeve 11. When the sliding sleeve 26 is moved from its working position rearwardly against the force of the spring 25, the ball 21 can be withdrawn in a radially enlarged portion 28 of the sliding sleeve 26 in which case the shaft 15 of the tool can be removed from the tool holder 5. The tool holder 5 does not have a radially enlarged portion for the ball 24 so that these parts cannot be separated from one another in the normal position. When it is necessary to remove these parts, for instance for substitution by new parts, the O-ring 27 of the sleeve 11 must be removed from the latter.

An O-ring 29 is received in a groove provided in the leading end portion 8 of the spindle 6. The O-ring 29 is located immediately behind the trailing end portion of the grooves 9 and serves for absorbing impacts of the sleeve 11. The O-ring 29 is axially and radially surrounded by a cup-shaped element 30 which consists of a plastic material or of metal. The trailing end portion of the cup-shaped element 30 outwardly surrounds the tubular part 2 of the hammer drill in a telescopic manner and thereby prevents drillings from entering the hammer drill, especially in the cases when the hammer drill is used for drilling vertically upwardly extending holes. The O-ring 29 serves as a stop element and as a damper for the tool holder 5 during axial impact, which is transmitted through the spindle 6 to the tool shaft 15.

In operation, working movement of the leading end portion 8 of the spindle 6 is transmitted to the tool shaft 15. Axial impact is directly transmitted from the leading end portion 8 of the spindle 6 through the end face surfaces 18 and 19 to the shaft 15 of the tool. The sleeve 11 serves only for transmission of torque and guiding the tool shaft 15. The sleeve 11 surrounds the leading end portion 8 and the shaft 15 with a gap therebetween equal to substantially between 1 and 5 millimeters. Impact energy is directly transmitted from the drive means to the tool without loss and recoil. This assures that in this case the tool holder is only slightly heated, and also that only small pressing force is required as compared with the conventional hammer drills. The sliding sleeve 26 unimpededly rotates relative to the sleeve 11 which enables the operator the hold the sleeve 26 with his hand and thereby to center and to guide the hammer drill during operation.

Figure 4:
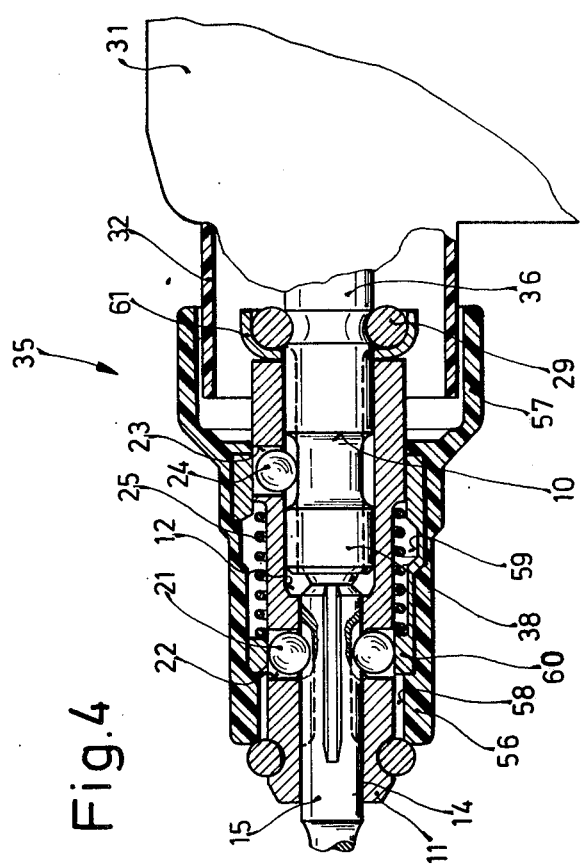
FIG. 4 is a longitudinal sectional view of a hammer drill in accordance with a second embodiment of the invention.

FIG. 4 illustrates a second embodiment of the present invention in which a tool holder 35 is substantially similar to the tool holder 5 of the first embodiment. The essential difference between the second and the first embodiments is that in accordance with the former a driving element is formed as a tool spindle 36 of the hammer drill 31 itself. The tool spindle 36 extends inside and axially outwardly projects from a tubular end portion 32 of a hammer drill housing. A leading end portion 38 of the tool spindle 36 corresponds to the leading end portion 8 of the spindle 6 of the first embodiment of the invention with respect to construction and functions thereof. The sleeve 11 is also provided having the first axial bore 12 for receiving the leading end portion 38 therein, and the second axial bore 14, coaxial with the axial bore 12, for receiving the tool shaft 15 therein. This sleeve corresponds to the sleeve 11 of the first embodiment of the invention. A sliding sleeve 56 is further provided outwardly overlapping outer inlet end portions of the radial bores 22 and 23, so as to prevent radially outward movement of the balls 21 and 24, which balls are radially movably received in the radial bores 22 and 23. The sliding sleeve 56 has a radially enlarged portion 58 positionable, in a first axial position of the sliding sleeve above the radial bore 22. In this case the balls 21 can be outwardly withdrawn in the enlarged portion 58 and thereby the tool shaft 15 can be removed from a tool holder 35, similarly to the first embodiment of the invention. The sliding sleeve has a second radially enlarged portion 59 positionable in a second axial position of the sliding sleeve 56 above the second radial bore 23. In this case the balls 24 can be outwardly withdrawn into the enlarged portion 59, and thereby the tool holder 35 can be removed from the leading end portion 38 of the tool spindle 36. In this embodiment the O-ring 29 is also provided which is located in a ring-shaped groove formed in the tool spindle 36 and serves for dampening impacts of the latter. A cup-shaped element 61 corresponds to the cup-shaped element 31 of the first embodiment of the invention with respect to its supporting functions. The function of preventing drillings from entering the hammer drill is performed in the second embodiment by an extension portion 57 formed at the trailing end of the sliding sleeve 56. The extension portion 57 outwardly surrounds the tubular portion 32 of the hammer drill housing in a telescopic manner. In the second embodiment of the invention the sliding sleeve 56 consists of a plastic material and is provided with metallic ring-shaped inserts 60. The sliding sleeve 26 of the first embodiment consists of steel; however, similarly to the sliding sleeve 56 of the second embodiment, the sliding sleeve 26 may consist of a plastic material having rigid steel ring-shaped inserts for supporting the balls.

It will be understood that each of the elements described above, or two or more together, may also find a useful application in other types of constructions differing from the types described above.

While the invention has been illustrated and described as embodied in a hammer drill, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a hammer drill, a combination, comprising a movable tool having a longitudinal axis and a first end portion; a driving element substantially coaxial with said tool, said driving element having a second end portion adjacent said first end portion and directly transmitting axial impacts from said driving element to said tool without transmission of torque; a tool holder surrounding said first and second end portions and transmitting torque from said driving element to said tool without transmission of axial impacts, said tool holder including a sleeve-shaped element coaxially surrounding said first and said second portions and having a longitudinal axis, said sleeve-shaped member being axially movable relative to and connected for joint rotation with said tool and said driving element; drive means for driving said driving element; and means for absorbing axial impacts of said sleeve-shaped member and including an O-ring located in an annular groove provided on the outer surface of said driving element, and a cup-shaped element axially and radially embracing said O-ring.

2. The combination as defined in claim 1, wherein said drive means are means for selectively imparting torque and/or axial impact to said driving element.

3. The combination as defined in claim 1; and further comprising means for connecting said sleeve-shaped member to said tool and said driving element for joint rotation therewith, said means being first interengaging formations formed on the inner surface of said sleeve-shaped member and the outer surface of said first end portion of said tool, and second interengaging formations formed on the inner surface of said sleeve-shaped member and the outer surface of the second end portion of said driving element.

4. The combination as defined in claim 3, wherein said first and second portions are cylindrical, said sleeve-shaped member is annular, and said interengaging formations comprise at least first and second pairs of interengaging recesses and projections, said first pair having a first recess formed in said first end portion of said tool and a first projection formed in said sleeve-shaped member, said second pair having a second recess formed in said driving element and a second projection formed in said sleeve-shaped member, said recesses and said projections having side wall portions extending in a substantially radial direction.

5. The combination as defined in claim 1, wherein said first end portion of said tool is provided with at least one substantially axially extending recess formed on the outer surface thereof and closed at both its axial ends, and said sleeve-shaped member is provided with at least one substantially radially extending through bore formed in a wall thereof; and further comprising means for limiting said axial movement of said sleeve-shaped member relative to said tool, said means comprising a radially movable ball-shaped element located in said radially extending through bore of said sleeve-shaped member and engaging said axially extending recess of said tool.

6. The combination as defined in claim 5, and further comprising a further sleeve-shaped member coaxially surrounding the first sleeve-shaped member and having a longitudinal axis, said further sleeve-shaped member being axially movable and rotatable relative to said first sleeve-shaped member and having a working position in which it is pressed against the latter, said further sleeve-shaped member having a first axial section overlapping an inlet end portion of said radially extending through bore of said first sleeve-shaped member in said working position so as to outwardly limit said radial movement of said ball-shaped element.

7. The combination as defined in claim 6; and further comprising means for pressing said further sleeve-shaped member against said first sleeve-shaped member, said means including a spring pressing said further sleeve-shaped member substantially lengthwise said longitudinal axis of the latter.

8. The combination as defined in claim 7; and further comprising means for preventing said axial movement of said further sleeve-shaped member in said working position thereof, said means having an additional O-ring located in an additional, ring-shaped groove provided at the outer surface of said first sleeve-shaped member, said spring pressing said further sleeve-shaped member against said additional O-ring, in said working position.

9. The combination as defined in claim 6, wherein said further sleeve-shaped member is movable to a first axial non-working position and further comprises a first radially enlarged portion, said first radially enlarged portion positionable above said ball-shaped member when said further sleeve-shaped member is in said first axial non-working position, so as to permit radially outward movement and disengagement of said ball-shaped element from said axially extending recess of said tool to thereby permit removal of the latter.

10. The combination as defined in claim 6, wherein said drive means have a housing provided with an axially extending substantially tubular part, said further sleeve-shaped member having a portion axially spaced from said tool and outwardly surrounding said tubular part of said housing of said drive means in a telescopic manner.

11. The combination as defined in claim 6, wherein said further sleeve-shaped member is of a plastic material.

12. The combination as defined in claim 11, wherein said further sleeve-shaped member has metallic inserts located on the inner surface thereof.

13. The combination as defined in claim 1, wherein said sleeve-shaped member has two axially spaced end sections, said sleeve-shaped member having a first inner axial bore for receiving said first end portion of said tool therein and a second inner axial bore for receiving said second portion of said driving element therein, said first axial bore being coaxial with said second axial bore and having a diameter lesser than the diameter of the latter, said axial bores being open at the respective end sections of said sleeve-shaped member.

14. The combination as defined in claim 1, wherein said drive means have a housing provided with an axially extending substantially tubular part, said cup-shaped element outwardly surrounding at least a section of said tubular part of said housing of said drive means, in a telescopic manner.

15. The combination as defined in claim 1, wherein and a drive means comprises a spindle member, said driving element of one piece with a spindle member of said drive means.

16. The combination as defined in claim 1, wherein said drive means have a tool head and a spindle member connected to said tool head, and a driving element of one-piece with said spindle member of said tool head.

17. In a hammer drill, a combination, comprising a movable tool having a longitudinal axis and a first end portion provided with at least one substantially axially extending recess formed on the outer surface thereof and closed at both its axial ends; a driving element substantially coaxial with said tool, said driving element having a second end portion adjacent said first end portion and directly transmitting axial impacts from said driving element to said tool without transmission of torque, said second end portion of said driving element being provided with at least one further substantially axially extending recess formed on the outer surface thereof and closed at both its axial ends; a tool holder transmitting torque from said driving element to said tool without transmission of axial impacts said tool holder including a sleeve-shaped member coaxially surrounding said first and said second portions and having a longitudinal axis, said sleeve-shaped member being provided with one and further substantially radially extending through bores formed in a wall thereof and axially spaced from one another; means for limiting axial movement of said sleeve-shaped member relative to said tool, including a radially movable ball-shaped element located in one radially extending through bore of said sleeve-shaped member and engaging said axially extending recess of said tool; means for retaining said ball-shaped element in said radially extending through bore of said sleeve-shaped element and including a further sleeve-shaped member coaxially surrounding said sleeve-shaped member and having a longitudinal axis, said further sleeve-shaped member being axially movable and rotatable relative to said sleeve-shaped member and having a working position in which it is pressed against the latter, said further sleeve-shaped member having a first axial section overlapping an inlet end portion of said radially extending through bore of said sleeve-shaped member in said working position so as to outwardly limit said radial movement of said ball-shaped element; means for limiting axial movement of said sleeve-shaped member relative to said driving element including a further radially movable ball-shaped element located in said further through bore of said sleeve-shaped member and engaging said further axially extending recess of said driving element; and drive means for driving said driving element.

18. The combination as defined in claim 17, wherein said further sleeve-shaped member has a second axial section overlapping in said working position an outer inlet portion of said further radially extending bore so as to outwardly limit said radial movement of said further ball-shaped element.

19. The combination as defined in claim 17, wherein said further sleeve-shaped member is movable to a second axial non-working position, and further comprises a radially enlarged portion, said radially enlarged portion positionable above said further ball-shaped element, when said further sleeve-shaped member is in said second axial non-working position, so as to permit radially outward movement and disengagement of said further ball shaped element from said further axially extending recess of said driving element to thereby permit removal of the latter.

* * * * *